UNITED STATES PATENT OFFICE.

JOSEPH KÖNIG, OF MUNSTER, GERMANY.

PROCESS OF MAKING FOODSTUFFS FROM SULFITE CELLULOSE WASTE LIQUORS.

1,128,154.      Specification of Letters Patent.      Patented Feb. 9, 1915.

No Drawing.      Application filed March 24, 1914. Serial No. 826,994.

*To all whom it may concern:*

Be it known that I, JOSEPH KÖNIG, a citizen of the German Empire, and residing at Munster, Westphalia, Germany, have invented a certain new and useful Improved Process of Making Foodstuffs from Sulfite Cellulose Waste Liquors, of which the following is a specification.

My invention relates to a process of utilizing the waste liquors which result from treating materials containing cellulose with sulfites.

I have heretofore disclosed how foodstuffs can be obtained from materials containing cellulose while at the same time obtaining cellulose, rosin and other accompanying substances. In this known process the wood was subjected under pressure to a gradual treatment with dilute alkalis and mineral acids under the action of heat in proportions which were as stoichiometric as possible, the waste liquors rich in organic substances hereby obtained being evaporated to dryness either separately or mixed together, and being able to be used as a foodstuff or as an admixture with other foodstuffs. On carrying this process into practice the defect is met with that the wood mass preliminarily treated with acids and alkalis, particularly the wood or coniferæ, remains relatively hard, for which reason the bleaching with hypochlorite salts or chlorin occupies a relatively long time. More recent investigations have shown me that this defect can be obviated by steaming the materials containing cellulose either only with dilute mineral acids (thus in the case of the wood of coniferous trees) or only with dilute alkalis (principally in the case of leaf-wood) for removing the hemicelluloses by hydrolysis, and then treating the materials thus preliminarily treated with bisulfite of lime in the same manner as is done as a rule with wood which is not preliminarily treated. In this manner a waste liquor is obtained in the sulfite process which is poor in sugar and contains principally only the lignin. One advantage of the further treatment of this liquor is that the sulfite waste liquor obtained from the preliminarily treated wood separates considerably more readily from the sulfurous acid than an ordinary sulfite waste liquor which has been obtained in the usual manner from untreated wood.

For working the sulfite waste liquor up into foodstuff I liberate it as completely as possible from free sulfurous acid by steaming or cooking and then mix lime or carbonate of calcium with it. The liquor is then liberated by one of the known processes from the bound sulfurous acid which is still present. After removing the gypsum the neutralized and sufficiently aerated liquor is then either evaporated to dryness by itself and worked up further, or is united with the first boiling liquid rich in sugar which was obtained when preliminarily treating the wood with alkali or acid.

It is obvious that the liquor rich in sugar obtained during the preliminary treatment can be worked up further to alcohol or sugar syrup before being mixed with the sulfite waste liquor; or, other valuable substances, such as rosin, adhesive substances, tannic acid and so on can be obtained separately and be utilized before this liquor of the preliminary treatment is mixed with the sulfite waste liquor.

Although the sulfite waste liquor contains only a small percentage of sugar, the residue of evaporation mixed with dry spent malt is eagerly devoured by animals, as trials have shown. It is better, however, when it is mixed with those liquors rich in sugar which are obtained during the preliminary treatment of the wood.

Example:—The wood disintegrated in the usual manner is steamed with about two to four times the quantity of dilute (about 0.4%–0.5%) sulfuric acid for 4 to 6 hours at some atmospheres above atmospheric pressure, *i. e.* 0.5 to 3 atmos., according to the kind of wood, the liquid rich in sugar is expressed or sucked away and after being neutralized with lime or with carbonate of calcium is evaporated to dryness. The wood remaining as a residue in the cooker is heated with hot water for a short time in order to remove the residue of sugar and acid, the water is then drawn off and utilized for a second cooking, the acid which is lacking being added. Sulfite liquor (of a strength of about 4–5° Bé.) such as usually employed in bleaching wood is added to the residue in the cooker and heated in the usual manner until the wood mass becomes soft. The completely steamed wood mass is worked up further in the same manner as takes place at present. The cooker liquor, on the other hand, which now substantially contains only the lignin, for the most part as sulfolignin, is first liberated as much as possible by heating from free sulfurous acid which can be recovered for further use, and then collected together with the first washing water in a tank and lifted from here a few meters to a graduation works, through which it falls down in the form of rain over pieces of limestone, if necessary mixed with pieces of coke, in order to pass after the repetition of this operation into a pit, in which the gypsum which is formed is caused to separate. The clear supernatant liquid is then either evaporated to dryness by itself or preferably together with the liquor rich in sugar of the preliminary treatment or with those liquors which remain behind after the alcoholic fermentation or other treatment of these liquors. The residue obtained after the evaporation to dryness and if necessary after more gypsum has been separated can be employed by itself as a foodstuff or it is mixed with a dry foodstuff, such as dry spent malt, clover or the like, in order to be used as fodder in this form, if necessary after being thoroughly dried.

It is obvious that the sulfite liquors may be neutralized and aerated in some other manner than by allowing them to trickle down graduation works. It is important that the aeration be effected as rapidly as possible and in as pure air as possible.

I claim:—

1. The process of producing fodder from materials containing cellulose, which consists in preliminarily heating the materials with dilute alkalis or dilute mineral acids under pressure, separating the lyes, neutralizing and drying by evaporation, heating the remaining cellulose with sulfite lye under pressure to open up and bleach the same, heating, neutralizing and aerating the separated sulfite waste lye to remove the sulfurous acid therefrom, and finally concentrating the lye.

2. The process of producing fodder or forage from materials containing cellulose, which consists in preliminarily heating such materials with dilute alkalis or dilute minerals acids under pressure, separating the lyes, neutralizing and drying the same by evaporation, heating the remaining cellulose with sulfite lye under pressure to open up and bleach the same, heating, neutralizing and aerating the separated sulfite waste lye to remove sulfurous acid therefrom, concentrating the lye, adding dry fodder to the concentrated lye or liquors, and drying the mixtures.

3. The process of producing fodder from materials containing cellulose, which consists in preliminarily heating such materials with dilute alkalis or dilute mineral acids under pressure, separating the lyes so obtained, neutralizing and drying the same by evaporation, heating the remaining cellulose with sulfite lye under pressure to open up and bleach the remaining cellulose, heating, neutralizing and aerating the separated sulfite lye to remove sulfurous acid therefrom, incorporating said lye with the neutralized lye obtained by the previous treatment with the alkali or acid, and finally concentrating the combined lyes.

4. The process of producing forage from materials containing cellulose, which consists in preliminarily heating such materials with dilute alkalis or dilute mineral acids under pressure, separating the lyes so obtained, neutralizing and drying the same by evaporation, heating the remaining cellulose with sulfite lye under pressure to open up and bleach the same, heating, neutralizing and aerating the separated sulfite lye to remove the sulfurous acid therefrom, incorporating said lye with the neutralized lye obtained by the previous treatment with alkali or acid, concentrating the combined lyes, adding dry fodder to the combined lyes, and further drying the mixture.

5. The process of producing fodder from materials containing cellulose, which consists in preliminarily heating such materials with dilute alkalis or dilute mineral acids under pressure, separating the lyes so obtained, recovering the valuable constituents therefrom, heating the remaining cellulose with sulfite lye under pressure to open up and bleach the same, heating, neutralizing and aerating the separated sulfite lye to remove the sulfurous acid therefrom, incorporating the lye from which the sulfurous acid has been removed with the other lyes from which the valuable constituents have been removed by the previous treatment with acid or alkali, and finally concentrating the same under pressure.

6. The process of producing forage from materials containing cellulose, which consists in preliminarily heating such materials with dilute alkalis or dilute mineral acids under pressure, separating the lyes so obtained, recovering the valuable constituents therefrom, heating the remaining cellulose with sulfite lye under pressure to open up and bleach the same, heating, neutralizing and aerating the sulfite lye to remove the sulfurous acid therefrom, combining the lye from which the sulfurous acid is removed with the other lyes treated with the alkali or acid and freed of said valuable constituents, concentrating the combined lyes, adding dry fodder to the combined lyes, and finally drying the mixture.

In testimony whereof, I affix my signature in the presence of two witnesses.

JOSEPH KÖNIG.

Witnesses:
 WOLDEMAR HAUPT,
 HENRY HASPER.